May 2, 1944.    P. B. NIEKIRK    2,348,089
FACE MILLING CUTTER
Filed July 17, 1941
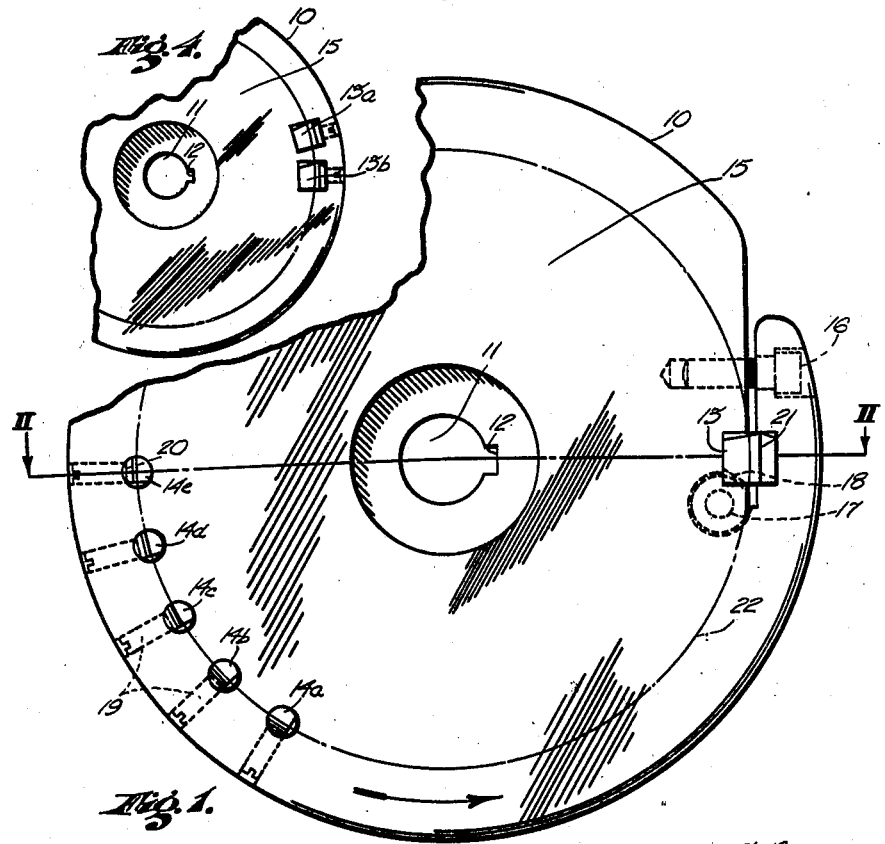
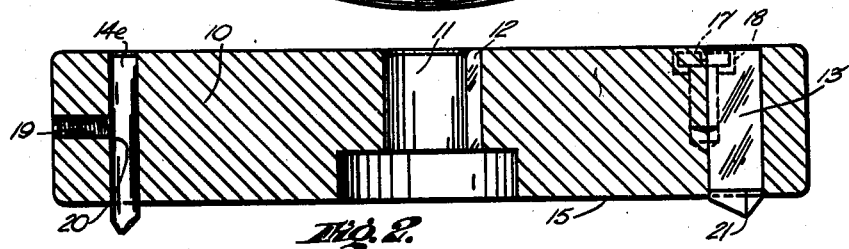
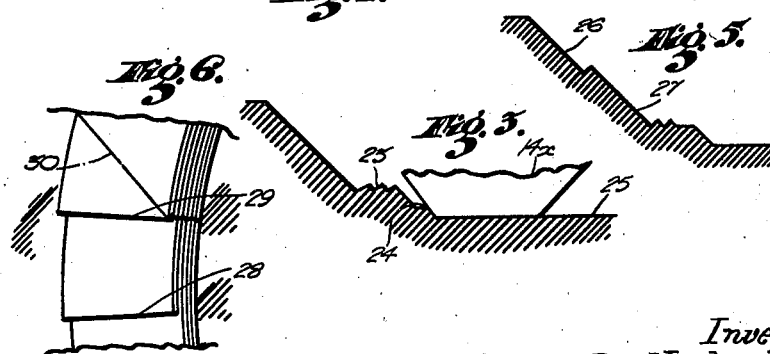
Inventor
Percy B. Niekirk
by Mawhinney & Mawhinney
Attorneys.

Patented May 2, 1944

2,348,089

UNITED STATES PATENT OFFICE 2,348,089

FACE MILLING CUTTER

Percy Ben Niekirk, Leeds, England, assignor to John Fowler & Co. (Leeds) Limited, Leeds, England Application July 17, 1941, Serial No. 402,818
In Great Britain April 29, 1941

5 Claims. (Cl. 29—105)

This invention relates to face milling cutters, and particularly to the kind including a rotatable body with angularly-spaced cutting tools inserted therein to extend from the operative radial face of the body, the tools being shaped dependently upon the operation required.

In the usual practice all the tools are set to take equal cuts in the work, whether these be light or heavy, so that work requiring a finishing cut after a roughing cut has to be submitted to a further operation.

The main object of the present invention is to avoid this drawback in a very simple manner.

A further object is to provide a face milling cutter which includes a rotatable body with angularly-spaced cutting tools extending from its operative radial face, one tool at least being adapted for a roughing cut and one at least for a finishing cut.

In a preferred arrangement the operative tip of the tool for the finishing cut is at a less radius (from the rotational axis of the body) than that at which the operative tip of the tool for the roughing cut is, by such an amount that a given surface of the work will receive the finishing cut after the roughing cut by at least one revolution of the body, and preferably by more than one revolution.

If desired, the finishing cut may be taken by a battery of tools all slightly spaced angularly from one another and materially from the roughing cut tool, the operative tips of the tools of the battery being at slightly different radii from the rotational axis of the body (which radii are all less than that at which the operative tip of the roughing cut tool is) and extending progressively further from the operative face of the body, that at the largest radius extending the least and that at the smallest radius extending the furthest. Conveniently it is the first tool of the battery which is set with its operative tip at the greatest radius from the body axis.

In like manner at least two roughing cut tools may be provided.

In the accompanying sheet of drawings:

Figure 1 is a fragmentary axial elevation of the operative face of one form of face milling cutter adapted according to the invention;

Figure 2 is a cross-section of the cutter taken on the line II—II of Figure 1;

Figure 3 is a diagram, to a much larger scale, indicating the manner of the cuts taken in a piece of work with the cutter of Figures 1 and 2, the view being a section through the work in a plane in which the rotational axis of the cutter lies;

Figure 4 is a fragmentary view, similar to that of Figure 1 but to a smaller scale, showing a pair of roughing cut or crash tools mounted in the body; and Figures 5 and 6 are diagrams showing alternative ways of taking cuts when two roughing tools are used, Figure 5 being a view similar to Figure 3 and Figure 6 a fragmentary plan view of the work surface.

The body 10 of the cutter is provided with a recessed central opening 11 and a keyway 12 by means of which it may be located on a driving shaft in any convenient manner. In the example shown in Figures 1 and 2 there is a single roughing tool 13 for taking a heavy roughing cut, and a battery of five tools 14a, 14b—14e for taking the finishing cut. The tools are all inserted in the body in any convenient manner so that their operative tips extend from the operative radial face 15 of the body. Thus, the drawings show the roughing tool as being clamped in a rectangular hole, provided through the body, by means of a screw 16, additional location being provided by means of a screw 17 inserted from the back of the body and engaging a recess, indicated at 18, at the back end of the tool. The finishing tools 14 are located in holes through the body by means of radially-arranged screws 19 engaged with recesses 20 of the tools.

From a consideration of the drawing it will be observed that the operative tip 21 of the roughing tool is at a greater radius than the circle 22 (Figure 1) through the axes of the tools, this circle being coaxial with the body and passing near the operative tips of the finishing tools, so that as the work is advanced towards the rotating cutter the roughing tool will be the first to act upon the work and will do so for more than one revolution before the first or leading finishing tool 14a engages the work. The finishing tools are arranged with their operative tips at slightly different radii (all less than that of the roughing tool), the first 14a being in this case at the greatest radius and the remainder having their tips at progressively less radii; and the operative tip of the first finishing tool extends from the operative face of the body a slightly less distance than the operative tips of the succeeding finishing tools, which all extend progressively further than the first. The arrangement is preferably such that the last of the finishing tools at least will not be in action until the roughing tool has completed its cut.

In this way the one cutter will serve for taking both roughing and finishing cuts in a single operation, as is diagrammatically illustrated by Figure 3. In this figure, 23 represents a surface which has been rough cut by the roughing tool, 24 a surface which has been cut by one of the finishing tools, and 25 a surface engaged by another finishing tool, indicated at 14x.

When two roughing tools 13a, 13b are used, they are preferably disposed in the body 10 near one another, as indicated by Figure 4. The second or following roughing tool 13b may be set with its operative tip at a less distance from the rotational axis of the body than that of the operative tip of the first or leading roughing tool 13a and at a greater distance from the operative face 15, in order to deepen the first heavy cut. This is illustrated by Figure 5, 26 representing the first heavy cut and 27 the second. Alternatively, the following roughing tool 13b may be set with its operative tip at a greater distance from the rotational axis than the tip of the leading tool 13a, the greater distance preferably being equal to half the feed of the work per tool revolution, in order to obtain evenness of cut, the operative tips of the two roughing tools being at the same distance from the face 15. This is illustrated by Figure 6, where 28 indicates the cut taken by the leading roughing tool 13a and 29 that taken by the following roughing tool 13b. The chain line 30 represents the edge of the work in a sectional view in the manner shown in Figure 5.

What I claim as my invention and desire to secure by Letters Patent of the United States is:

1. A face milling cutter for forming a flat surface on the work and including a rotatable body having an operative radial face, a finishing tool carried by said body to extend from said operative face, and a roughing tool carried by said body to extend from said operative face, said roughing tool being positioned angularly from said finishing tool and having its operative tip at a less distance from said operative face than the operative tip of said finishing tool, and said roughing tool having its operative tip at a greater distance from the rotational axis of the body than the operative tip of said finishing tool by an amount equal to the feed of the work per body revolution.

2. A face milling cutter for forming a flat surface on the work substantially parallel to the face of the cutter body and including a rotatable body having an operative radial face, a battery of finishing tools carried by said body to extend from said operative face, the tools of said battery being slightly angularly-spaced from one another and arranged so that their operative tips are at slightly different distances from the rotational axis of said body and so that their operative tips are at slightly different distances from said operative face, the operative tip of the first or leading tool being at the greatest distance from said rotational axis and the operative tips of the succeeding tools being at progressively less distances from said rotational axis, and the operative tip of the first tool being at the least distance from said operative face and the operative tips of the succeeding tools being at progressively greater distances from said operative face, and a roughing tool carried by said body to extend from said operative face, said roughing tool being positioned angularly from said battery and having its operative tip at a less distance from said operative face than the operative tips of any of said finishing tools, and said roughing tool having its operative tip at a greater distance from said rotational axis than the operative tips of said finishing tools by an amount equal to the feed of the work per body revolution whereby the last of said finishing tools at least will not be in action until the roughing tool has completed its cut, said finishing tools and said roughing tool being structurally separate with the roughing tool being outside the circumference of movement of said finishing tools.

3. A face milling cutter for forming a plane surface on the work in a single operation and including a rotatable body having an operative radial face, a finishing tool carried by said body to extend from said operative face, and a pair of rouhing tools carried by said body to extend from said operative face, said roughing tools positioned near one another and spaced angularly from said finishing tool, said roughing tools having their operative tips at a less distance from said operative face than the operative tip of said finishing tool, and having their operative tips at greater distances from the rotational axis of the body than the operative tip of said finishing tool, the second or following roughing tool being set with its operative tip at a greater distance from said rotational axis than the operative tip of the first or leading roughing tool by an amount equal to half the feed of the work per body revolution, the operative tips of the two roughing tools being at the same distance from said operative face, whereby to obtain evenness of cut from the two roughing tools, said roughing tools being outside the circumference of said finishing tool.

4. A face milling cutter including a rotatable body having an operative radial face, a battery of finishing tools carried by said body to extend from said operative face, the tools of said battery being slightly angularly-spaced from one another but arranged in a group; and a plurality of rough cut tools carried by said body to extend from said operative face, said rough cut tools being positioned near one another and spaced angularly from said battery of tools, said rough cut tools having their operative tips at a less distance from said operative face than the operative tips of any of said finishing tools, and said rough cut tools having their operative tips at greater distances from the rotational axis of said body than the operative tips of any of said finishing tools, by an amount equal to the feed of the work per body revolution, said roughing tools being outside the circumference of movement of said finishing tools.

5. A face milling cutter for forming a plane surface on the work in a single operation and including a rotatable body having an operative radial face, a battery of finishing tools carried by said body to extend from said operative face, the tools of said battery being slightly angularly-spaced from one another and arranged so that their operative tips are at slightly different distances from the rotational axis of said body and so that their operative tips are at slightly different distances from said operative face, the operative tip of the first or leading tool being at the greatest distance from said rotational axis and the operative tips of the succeeding tools being at progressively less distances from said rotational axis, and the operative tip of the first tool being at the least distance from said operative face and the operative tips of the succeeding tools being at progressively greater distances from said operative face, and a plurality of roughing tools carried by said body to extend from said operative face, said roughing tools being positioned near one another with their operative tips at a less distance from said operative face than the operative tips of any of said finishing tools, and said roughing tools having their operative tips at greater distances from said rotational axis than the operative tips of any of said finishing tools by an amount equal to the feed of the work per body revolution, said roughing tools being outside the circumference of movement of said finishing tools.

PERCY BEN NIEKIRK.